United States Patent
Zimmermann et al.

(10) Patent No.: US 9,457,526 B2
(45) Date of Patent: Oct. 4, 2016

(54) CALIBRATION DEVICE FOR CALIBRATING AN EXTRUDED FILM TUBE

(71) Applicant: Kdesign GmbH, Konigswinter (DE)

(72) Inventors: Richard Zimmermann, Bonn (DE); Gerd Fahling, Eitorf (DE)

(73) Assignee: Kdesign GmbH, Konigswinter (DE)

( * ) Notice: Subject to any disclaimer, the term of this patent is extended or adjusted under 35 U.S.C. 154(b) by 0 days.

(21) Appl. No.: 14/272,208

(22) Filed: May 7, 2014

(65) Prior Publication Data
US 2014/0335213 A1 Nov. 13, 2014

(30) Foreign Application Priority Data

May 8, 2013 (EP) ..................... 13167100

(51) Int. Cl.
| | |
|---|---|
| *B29C 47/90* | (2006.01) |
| *B29D 23/00* | (2006.01) |
| *B29C 47/00* | (2006.01) |
| *B29C 47/34* | (2006.01) |
| *B29C 47/88* | (2006.01) |
| *B29C 47/92* | (2006.01) |
| *B29C 47/20* | (2006.01) |

(52) U.S. Cl.
CPC ........... *B29D 23/00* (2013.01); *B29C 47/0057* (2013.01); *B29C 47/34* (2013.01); *B29C 47/8835* (2013.01); *B29C 47/903* (2013.01); *B29C 47/907* (2013.01); *B29C 47/908* (2013.01); *B29C 47/92* (2013.01); *B29C 47/0026* (2013.01); *B29C 47/20* (2013.01); *B29C 2947/926* (2013.01); *B29C 2947/92704* (2013.01); *B29C 2947/92971* (2013.01)

(58) Field of Classification Search
CPC ......... B29C 47/0026; B29C 47/0057; B29C 47/20; B29C 47/34; B29C 47/8835; B29C 47/903; B29C 47/907; B29C 47/908; B29C 47/92; B29C 2947/92704; B29C 2947/92971
See application file for complete search history.

(56) References Cited

U.S. PATENT DOCUMENTS

| | | | |
|---|---|---|---|
| 3,167,814 A | * | 2/1965 | Corbett ........................ 425/72.1 |
| 3,810,725 A | | 5/1974 | Trub et al. |
| 3,980,418 A | | 9/1976 | Schott, Jr. |
| 4,388,061 A | * | 6/1983 | Bebok ................... B29C 47/907 |
| | | | 264/566 |

(Continued)

FOREIGN PATENT DOCUMENTS

| | | |
|---|---|---|
| DE | 2003289 A1 | 8/1971 |
| DE | 2259732 A1 | 6/1974 |

(Continued)

*Primary Examiner* — Yogendra Gupta
*Assistant Examiner* — Joseph Leyson
(74) *Attorney, Agent, or Firm* — Dinsmore & Shohl LLP

(57) ABSTRACT

A calibration device for calibrating an extruded film tube, above the frost line, forms an annular gap between the calibration device and the film tube. The calibration device includes a plurality of calibration segments and at least one blowing nozzle. The plurality of calibration segments are distributed around a longitudinal axis and form a central feed through opening for feeding through the film tube along the longitudinal axis. The calibration segments are adjustable for adjusting the diameter of the feed through opening. The at least one blowing nozzle for each calibration segment, feeds a calibration gas to the feed through opening. The at least one blowing nozzle is formed such, that the calibration gas is guided to the annular gap substantially parallel to a surface of the film tube and that the calibration gas flows through the annular gap in a single flow direction.

20 Claims, 3 Drawing Sheets

(56) References Cited

U.S. PATENT DOCUMENTS

| | | | |
|---|---|---|---|
| 4,728,277 A * | 3/1988 | Planeta | 425/72.1 |
| 7,604,770 B2 | 10/2009 | Wedell et al. | |
| 2007/0194501 A1 | 8/2007 | Linkies et al. | |

FOREIGN PATENT DOCUMENTS

| | | |
|---|---|---|
| DE | 2638744 A1 | 3/1977 |
| DE | 3333397 A1 | 4/1985 |
| DE | 3637941 A1 | 6/1987 |
| DE | 9214651 U1 | 2/1993 |
| DE | 202005006532 U1 | 6/2005 |
| DE | 102005048217 A1 | 4/2007 |
| DE | 102005051874 A1 | 5/2007 |
| DE | 102007058405 A1 | 5/2009 |
| EP | 0143154 A1 | 6/1985 |
| EP | 0273739 A1 | 7/1988 |
| EP | 1488910 A1 | 12/2004 |
| WO | 2005084919 A1 | 9/2005 |

\* cited by examiner

CALIBRATION DEVICE FOR CALIBRATING AN EXTRUDED FILM TUBE

CROSS-REFERENCE TO RELATED APPLICATIONS

This application claims priority of European Patent Application 13167100.0 filed May 8, 2013, the contents of which are incorporated herein by reference.

FIELD OF THE INVENTION

The invention relates to a calibration device for calibrating an extruded film tube above the frost line, wherein between the calibration device and the film tube an annular gap is formed, comprising several calibration segments, which are arranged distributedly around a longitudinal axis and which from a central feed through opening for feeding through a film tube along the longitudinal axis, wherein the calibration segments are adjustable for adjusting the diameter of the feed through opening, and at least one blowing nozzle for each calibration segment, through which calibration gas fed to the feed through opening.

BACKGROUND OF THE INVENTION

Well known in the art are contacting calibration devices with roller arms as calibration means, which are adapted via different adjustment devices to the diameter of the blown film tube. In other design principals, as for example described in DE 26 38 744 A1, the calibration means, contacting the film, consist of curved rods, on which a multitude of small rings is arranged, which are rotated by contact with the film. This design type is extremely prone to contamination and leaves markings or even surface damages on the blown film depending on the degree of contamination on the separation positions of the Teflon rings.

In newer improved design types, the above named embodiment of the calibration means is substituted by straight castors with ball-bearing. For example, from DE 20 2005 006 532 U1 it is known, to provide several castors with more or less horizontal axis and with essentially tangential arrangement to the round film tube, wherein the castors are arranged circumferentially distributed in several planes arranged above each other. The castors form in a top view a polygonal cross-section, which forms a feed through opening for the film tube. The castors are radially adjustable, so that the diameter of the feed through opening can be adapted to the diameter of the film tube. The castors are in contact with the film tube and are rotatably arranged for preventing markings on the film tube around the horizontal axes. For the castor surface, materials are used, which prevent an adhesion of the film tube on the castors, like for example Teflon, nylon, silicone or similar materials. Insofar a structured castor surface is required, also foam material, felt or similar materials can be used.

The film tube is extruded from a thermoplastic material and evaporates waxy components (monomers), which can settle on the castors of the calibration device. Thus, an increased resistance during the rotation of the castors is produced. Furthermore, also the encasings get dirty after a while and leave markings, insofar as no regular cleaning or exchange of the castor casings is carried out.

Furthermore, contact-free working calibration devices exist, in which instead of castors fixed, non-rotatable guide bodies are provided as calibration means, from which an air curtain is expelled from a micro-porous surface in direction of the film tube, to prevent a film contact. Such embodiments are described in detail for example in EP 1 488 910 B1 and WO 2005/084919A1.

These constructions are extremely prone to contamination, as the porous surface clogs up easily because of the oily monomers, evaporating during the extrusion process from the melt film in connection with the dust from the surrounding air. Furthermore, the complete prevention of contact is not always ensured, as the velocity vector of the diffuse exiting air curtain, directed at a right angle against the film tube, is small and is not always sufficient as a counter force, when the film tube is agitated in plants with high performance by the velocity of the cooling air, expelled in the tube formation zone to high frequency movements.

For preventing these disadvantages EP 0 143 154 A1 proposes a calibration device, which has an annular support element, which encloses the film tube externally. The support element is provided with ring channels open towards the inside and which have ducts for feeding air. The ring channels are limited by flanks, wherein such an air amount is blown into the ring channels, that the air flowing away via the lateral flanks forms an air cushion supporting the drawn-off film tube. Thus it is ensured, that the film tube does not contact the support element.

DE 36 37 941A1 shows a device for post-cooling and calibrating guiding of a film tube above the glass transition temperature boundary of the film tube. This comprises a hose ring, which encloses and does not touch the film tube and which on its inner side, directed toward the film tube has blow bores, which are directed onto the film tube. The hose ring can, in this case, when seen in circumferential direction, consist of individual arcuate portions and can be manufactured from a material, which enables a deformation and thus an adaptation of the hose ring to different diameters of the film tube.

A calibration device of the above named type is disclosed in EP 0 273 739 A1. The calibration device comprises a calibration ring, which encloses completely the film tube, or several calibration segments, which extend along a portion of the circumference of the film tube. These have respectively two slot-like openings, directed inward, wherein one of the slot-like openings is aligned in the drawing-off direction of the film tube and one of the slot-like openings is aligned against the drawing-off direction of the film tube. The two slot-like openings are, furthermore, directed away from each other, so that a zone with low pressure or a zone with a partial vacuum is produced between the two openings. This zone with low pressure serves to attract the film tube to the calibration segment, wherein the air flows exiting the slot-like openings, form respectively an air cushion, which prevents, that the film tube contacts the calibration segment. Furthermore, the surface of the calibration segment in the area of the zone with low pressure is set back relative to the other surfaces of the calibration segment, facing the film tube, so that also because of this it is ensured, that the film tube does not contact the calibration segment.

Disadvantageous in the known embodiments is, that the air is fed in a direction transversally to the surface of the film tube, whereby a direct force is acting on the film tube, which can lead to a deformation or also to an instability of the film tube. Or zones with low pressure are present as according to EP 0 273 739 A1, which, according to the experience made, can lead to a pulsating movement of the film tube, what again effects the stability of the guidance of the film tube.

The object of the present invention is to propose a calibration device, which ensures a stable guidance of the extruded film tube.

SUMMARY OF THE INVENTION

The object is met by a calibration device for calibrating an extruded film tube above the frost line, wherein between the calibration device and the film tube an annular gap is formed, comprising several calibration segments, which are arranged distributedly around a longitudinal axis and which from a central feed through opening for feeding through a film tube along the longitudinal axis, wherein the calibration segments are adjustable for adjusting the diameter of the feed through opening, and at least one blowing nozzle for each calibration segment, through which calibration gas fed to the feed through opening.

One advantage of the inventive calibration device is that the at least one blowing nozzle is formed such, that the calibration gas is fed at least more or less parallel to a surface of the film tube to the annular gap. Thus, no direct force component of the calibration gas flow is produced on the film tube. In the contact-free calibration device according to the present invention, the Venturi- or Bernoulli-effect is used, by means of which a calibration gas flow, guided with sufficient velocity tangentially along a surface of the calibration segment, facing the film tube, acts with a sucking and fixing force on a sufficiently closely arranged, movable element, in this case the film tube, without that there is a contact between the film tube and one of the calibration segments. The film tube takes up, because of this force in connection with the calibration gas cushion as a counter force, a stable distance position to the calibration segment.

Furthermore, this configuration of the blowing nozzles provides that the calibration gas flows through the annular gap in only one flow through direction. This prevents a central zone with low pressure or with a partial vacuum, which pressure deviates from the pressure within the flow of the calibration gas, so that an instability or the film tube or a pulsating movement of the film tube is avoided.

Furthermore, the flow through the annular gap in exactly one flow direction has the advantage, that several calibration segments arranged above each other do not influence each other, as the total flow direction of all the calibration segments and thus of the whole calibration device is identical.

The calibration segments are, when seen in a top view in direction of the longitudinal axis, arranged around the same in a distributed manner. For all intents and purposes they also can be distanced from each other along the longitudinal axis. When seen in a top view, the feed through opening results, through which the film tube is passed through the calibration device.

The calibration gas is preferably air. However, other gases or gas compositions can be used.

Preferably, the calibration segments are formed such, that, on an inlet side of the calibration device the ambient air is sucked into the annular gap. Thus, an amplification of the air flow takes place, i.e. a larger amount of calibration gas or air is passed through the annular gap, than calibration gas is fed to the annular gap. Thus, energy can be saved, as a lower amount of calibration gas has to be made available.

To achieve this, a specific flow velocity of the calibration gas is necessary. The flow velocity can be increased such, that at least one blowing nozzle for each calibration segment is formed slot-like in form of a blowing gap. In this case, the blowing gap has preferably a gap width of less than a millimeter. It is especially advantageous, when the blowing gap has a slot width of less than 0.5 mm.

To ensure, that the calibration gas does not provide an excessive pressure, which also would lower the energy efficiency, it is preferably provided, that the blowing gap has a gap width of larger than 0.2 mm.

To ensure the suction of ambient air as efficiently as possible, it can be provided, that the at least one blowing nozzle is arranged outside of the feed through opening. This means, that the calibration gas flows at least partially outside of the feed through opening and thus pulls ambient air along.

For this it can be provided, that the at least one blowing nozzle for each calibration segment expels the calibration gas along a outline face, which extends into a guide face within the feed through opening. Thus, in the area of the outline face ambient air can be dragged along.

In this case, the calibration segments can be formed such, that the calibration gas expelled from the expel opening follows the progress of the outline face. In this case, the outline face can be part of an outer face of the respective calibration segments. Preferably, the outline face is at least partially arched, preferably formed convex, for diverting the flow of the gaseous medium. The arched part of the outline face has in this case preferably a radius of at least 4 mm, preferably between 4 mm and 10 mm.

In this case the so-called Coander-effect is used, according to which a fluid has the tendency, to flow along a convex surface, without detaching itself from the surface and without moving further in the original flow direction. In this case it is relevant, that a jet follows the convex face and flows along the same, so that the jet of the fluid moves within, e.g. the ambient air, which is at rest. This leads to the fact, that the jet of the fluid does not detach itself from the convex face, as this would happen in a normal flow, in which the total ambient air flows along the convex face.

In the calibration device according to the invention it can be advantageous, that the blowing nozzle expels the calibration gas transversally to the longitudinal axis, preferably at a right angle to the longitudinal axis.

To ensure a sufficient velocity of the calibration gas after exiting the blowing nozzle, it is connected to at least one pressure source. In this case it generally can be a pneumatic source. However, to be able to use a cheap pressure source, as for example a blower, and thus to prevent the cost intensive provision of pressurised air, it can be provided, that the pressure source provides the calibration gas with a pressure of less than 0.5 bar, preferably less than 0.2 bar.

Preferably, the calibration segments are formed like arcuate portions around the longitudinal axis. Generally, however, the calibration segments can also be formed straight.

Furthermore, it can be provided, that adjustment means are provided, through which the volume flows and/or the temperature of the calibration gas flows, exiting the calibration segments, can be controlled and adjusted for each calibration segment.

Also several calibration segments can be arranged above one another, wherein the calibration segments, arranged above each other, are adjustable to different diameters of the feed through opening, so that the feed through opening is tapered along the longitudinal axis and along the film tube, e.g. in drawing-off direction of the film tube, to be able to allow for the shrinkage effect of the film tube during the solidification.

BRIEF DESCRIPTION OF THE DRAWINGS

In the following a preferred embodiment is described in detail by using the drawings. In these, it shows.

DETAILED DESCRIPTION OF THE INVENTION

Figure 1:
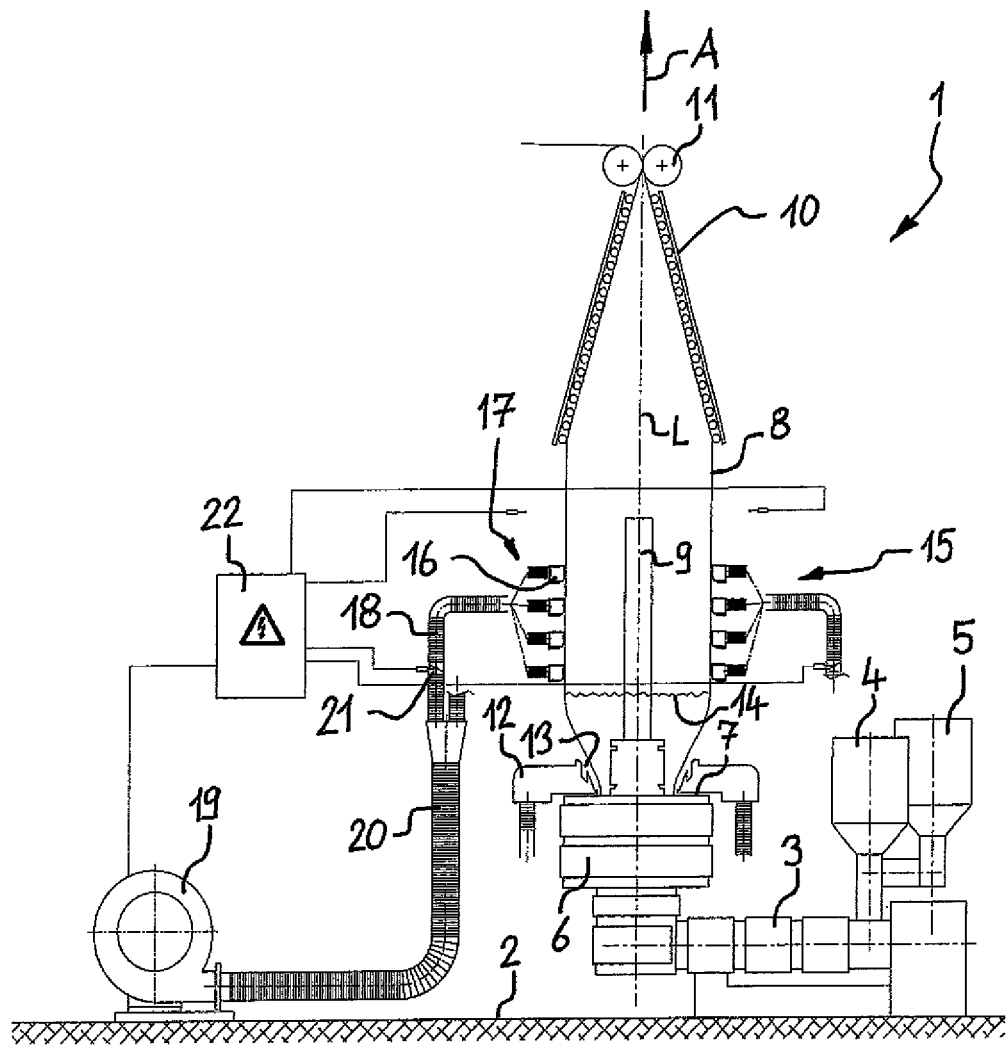
FIG. 1 is a side view of a film blowing installation.

FIG. 1 shows a side view of a film blowing installation 1. An extruder 3 rests on a bottom 2, at which two feeding hoppers 4, 5 for thermoplastic material are visible. The thermoplastic material, fed in granulate form via the feeding hoppers 4, 5, is plasticized and homogenized by pressure and additional heating means in a screw of the extruder and is pushed into a blow head 6 with vertical axis following the extruder 3. The blow head 6 has on its upper side 7 an annular die, not visible here and from which a film tube 8 from initially still plasticized thermoplastics exits, which expands and which is axisymmetrical to a longitudinal axis L. The film tube 8 is blown up with air after exiting the annular die, for which an air inlet 9 serves, which is arranged within the annular die and is arranged within the film tube 8. Thus, the still plasticizable film tube is expanded. After solidification of the plastic material of the film tube 8, this maintains essentially its diameter. The film tube 8 is drawn off along the longitudinal axis L further upwards in drawing-off direction A and is pressed flat in a flattening device 10 and is guided via a draw-off device 11 upwards. The flattened film tube 8 is then wound onto coils.

Directly above the blow head 6, a cooling ring 12 with discharge nozzles 13 arranged inwards, is provided, from which cooling gas exits and flows annularly and essentially parallel to the film tube 8, which has a higher internal pressure. The film tube 8, plasticized in this area, expands initially diameter-wise because of the named excess pressure internally, till it solidifies under the effect of the cooling gas and adopts a constant diameter. The position of the transition from the plasticized plastic material to the solidified plastic material is called frost line and is given the reference numeral 14. Above, i.e. in the drawing-off direction A downstream of the frost line 14, a calibration device 15, which comprises several calibration segments 16, which are annularly arranged around the longitudinal axis L and around the circumference of the film tube 8, are provided. To enable an adaptation to film tubes of different diameter, the calibration segments 16 are mounted approximately radial to the longitudinal axis L displaceable on a carrier frame 17. The calibration device 15 is a contact-free calibration device 15, which components do not contact the film tube 8. For this, each calibration segment 16 is connected via calibration gas pipes 18 to a blower 19. The blower 19 blows air into the calibration gas pipes 18 to the individual calibration segments 16, wherein the calibration segments 16 have blowing openings, which are described in detail later and which expel the air or another gaseous fluid in direction towards the film tube 8. The calibration gas pipes 18, which lead to the individual calibration segments 16, are fed from a common main pipe 20. In the calibration gas pipes 18, respectively flow flaps 21 are arranged, to be able to control the calibration gas flow within the individual calibration gas pipes 18. Thus the volumes of the calibration gas flows can be controlled via a control 22 and if necessary the temperature of the calibration gas flows to the individual calibration segments 16 can be controlled segment-wise via a heating element, not shown here, so that the volume flow and/or the temperature of the calibration gas can be adjusted variably in segments for each segment along the circumference.

Figure 2:
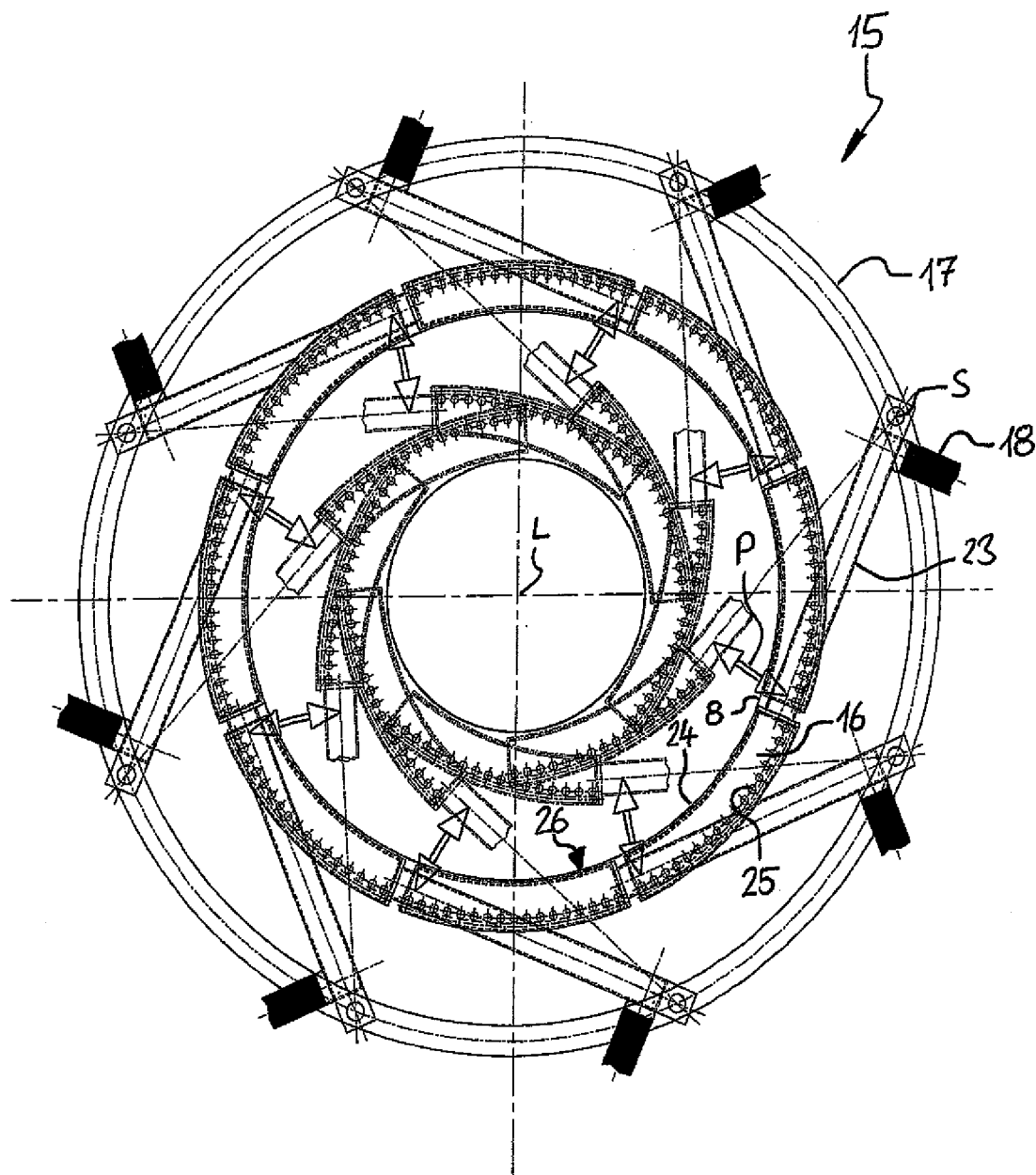
FIG. 2 is a top view on a calibration device according to the invention in two different positions of the calibration elements.

FIG. 2 shows the calibration device 15 in a top view vertically to the longitudinal axis L. In total eight calibration segments 16 are provided, which are shown in two different positions. As already explained above, the calibration segments 16 are adjustable more or less radially relative to the longitudinal axis L. In FIG. 2 the calibration segments 16 are shown in a radial outer position and in a radial inner position.

The carrier frame 17 is, when seen in alignment, formed annular and is arranged around the film tube 8. On the carrier frame 17, the calibration segments 16 are pivotably mounted, wherein in the following one of the calibration segments 16 is described exemplary for all other calibration segments.

The calibration segment 16 is connected fixedly at one of its ends to an end of an arm 23, wherein the end of the arm 23 remote from the calibration segment 16 is attached pivotably around a pivot axis S on the carrier frame 17. The pivot axis S extends parallel to the longitudinal axis L. The arm 23 is formed tubular, to be able to carry the calibration gas. At the end facing the pivot axis S, the arm 23 is flow-wise connected to a calibration gas pipe 18, so that the calibration air can flow from the calibration gas pipe 18 into the arm 23. On the side facing away from the pivot axis S, the arm 23 is connected such to the calibration segment 16, that the calibration air can flow from the arm 23 into the calibration segment 16. The calibration segment 16 is also formed tubular. In the calibration segment 16, bores 25 are provided, through which the calibration air is guided to an expel nozzle, not shown here and described in detail later, which is used for a contact-free guidance and calibration of the film tube 8.

The calibration segment 16 is formed, when seen in a top view according to FIG. 2, arcuate and has a guiding face 24 directed inward and which is adapted to the largest possible diameter of the film tube 8. All calibration segments 16 are arranged distributed around the longitudinal axis L and enclose the film tube between each other. Together the individual annular segments 16 form a ring with a central feed through opening 26 for passing the film tube 8 through.

The calibration segments 16 can respectively be pivoted inwardly around the pivot axis S, so that the feed through opening 26 is reduced iris-shaped in the diameter, as it is shown internally in the second position. In the inner pivot position the arms 23 together with the calibration segments 16 are pivoted in the direction of the arrow P inwardly, so that a film tube 8 with a small diameter can be calibrated.

Generally also other adjustment possibilities can be considered for the calibration segments 16, like scissor mechanisms or radially extending linear drives. It is also generally possible, that the calibration segments 16 are not formed arcuate but are formed straight.

Figure 3:
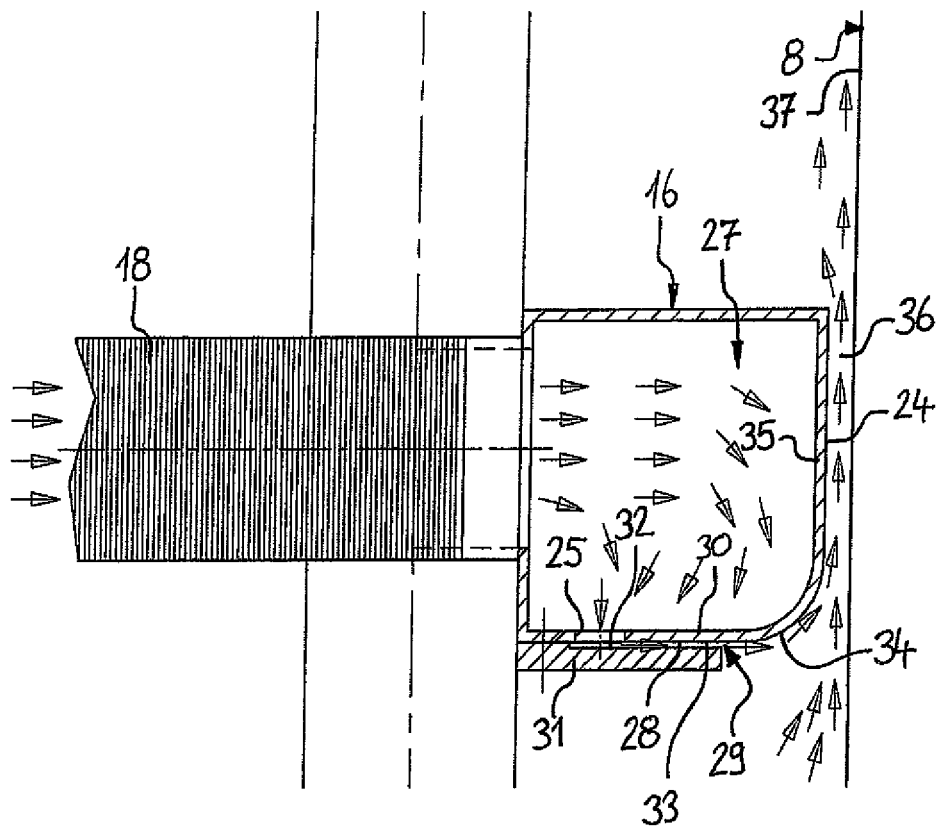
FIG. 3 is a cross-sectional view through one of the calibration segments of the calibration device according to FIG. 2.

FIG. 3 shows a cross-section through one of the calibration segments 16, wherein the sectional plane is aligned parallel to the longitudinal axis L. The calibration segment 16 is provided in the form of a hollow profile material and forms a calibration gas channel 27, which is fed by the calibration gas pipe 18 with calibration gas, wherein the flow directions of the calibration gas is indicated by the arrows shown in the calibration gas channel 27. The calibration gas is fed from the calibration gas channel 27 through the bores 25 in a first side wall 30 of the calibration segment 16 to a slot-like blowing nozzle 28 in form of a blowing gap, wherein the calibration gas exits then from an exiting opening 29. The blowing nozzle 28 extends more or less across the whole length of the calibration segment 16 along a part of the circumference of film tube 8, wherein the blowing nozzle 28 is fed by the multitude of bores 25 with calibration gas. The blowing nozzle 28 is formed by the first side wall 30 and a nozzle plate 31, which is mounted externally on the first side wall 30. The first side wall 30 has an outer face 33, on which the nozzle plate 31 is attached, wherein the nozzle plate 31 has an inner face 32, which faces the outer face 33 and which is arranged with a distance thereto, so that the blowing nozzle 28 forms a blowing gap. The exiting opening 29 is facing the film tube 8, wherein the outer face 33 of the first side wall 30 is arranged vertically to the longitudinal axis L and thus, transversally to the film tube 8.

The outer face 33 has within the blowing nozzle 28 a flat progress and ends in a outline face 34 starting from the exiting opening 29 in direction towards the film tube 8, which outline face 34 has partially an arcuate contour. The arcuate contour of the outline face 34 ends in the guide face 24 of a second side wall 35 directed inward. The guide face 24 is aligned in the cross-section shown in FIG. 3, parallel to an upper face 37 of the film tube 8, so that a gap, which represents an annular gap 36 in relation to all annular segments 16 along the whole circumference, between the guide face 24 and the film tube 8.

The calibration gas is thus diverted through the bore 25 and the blowing nozzle 28 and flows within the blowing nozzle 28 and also shortly after exiting from the exiting opening 29 transversally to the film tube 8 and parallel to the outline face 34 of the first side wall 30. A curtain-like calibration gas flow with very limited thickness is formed, which flows parallel to the outer face 33. Because of the Coander-effect this calibration gas flow does not separate from the outer face 33, but follows the outline face 34 and thus is diverted in a direction parallel to the film tube 8 in the annular gap 36. In this case, ambient air is pulled along on an inflow side of the calibration device 15 from below the calibration segments 16, so that an air amplification is achieved. The gas volume flowing in the end through the annular gap 36, is a multiple of the volume of calibration gas exiting from the exiting opening 29.

Because of the high flow velocity of the gas within the annular gap 36, a Venturi-effect is achieved, which pulls the film tube 8 toward the guide face 24, wherein the film tube 8 does not contact the guide face 24, as the flowing gas forms an air cushion. Thus, the film tube 8 can be held at a constant distance to the guide face 24 and can be guided as a whole and can be calibrated.

The Coander-effect is also dependent on the flow velocity and the thickness of the flow jet or the flow curtain of calibration gas. It has been shown, that good effects can be achieved, when a pressure of below 0.5 bar, preferably of below 0.2 bar, is adjusted within the calibration gas channel 27. Especially advantageous is then a gap width of the blowing nozzle 28 of less than 1 mm, preferably less than 0.5 mm and preferably more than 0.2 mm. The radius of the arcuate part of the outline face 34 is in cross-section at least 4 mm, preferably 4 mm to 10 mm.

REFERENCE NUMERALS LIST 1 film blowing installation
2 bottom
3 extruder
4 feeding hopper
5 feeding hopper
6 blow head
7 upper side
8 film tube
9 air inlet
10 flattening device
11 draw-off device
12 cooling ring
13 discharge nozzle
14 glass transition temperature boundary
15 calibration device
16 calibration segment
17 carrier frame
18 calibration gas pipe
19 blower
20 main pipe
21 flow flap
22 control means
23 arm
24 guiding face
25 bore
26 feed through opening
27 calibration gas channel
28 blowing nozzle
29 exiting opening
30 first side wall
31 nozzle plate
32 inner face
33 outer face
34 outline face
35 second side wall
36 annular gap
37 surface
L longitudinal axis
A drawing-off direction
S pivot axis
P arrow

The invention claimed is:

1. A calibration device for calibrating an extruded film tube above a frost line, the calibration device comprising;
a plurality of calibration segments distributed around a longitudinal axis and forming a central feed through opening for feeding through the film tube along the longitudinal axis, the calibration segments are adjustable for adjusting the diameter of the feed through opening, an annular gap is formed between each of the plurality of calibration segments and a surface of the film tube, and
at least one blowing nozzle for each calibration segment, said at least one blowing nozzle feeds a calibration gas to the feed through opening, the at least one blowing nozzle is formed such that the calibration gas is guided to the annular gap substantially parallel to the surface of the film tube,
wherein all the calibration gas that exits each of the plurality of calibration segments and that flows through the annular gap flows through the annular gap in only one flow direction.

2. The calibration device according to claim 1, wherein the calibration segments are formed such, that ambient air is sucked into the annular gap on an inlet side of the calibration device.

3. The calibration device according to claim 1, wherein the at least one blowing nozzle for each calibration segment is formed slot-like in the form of a blowing gap.

4. The calibration device according to claim 3, wherein the blowing gap has a gap width of less than 1 mm.

5. The calibration device according to claim 3, wherein the blowing gap has a gap width larger than 0.2 mm.

6. The calibration device according to claim 1, wherein the blowing nozzles are arranged outside of the feed through opening.

7. The calibration device according to claim 1, the at least one blowing nozzle for each calibration segment expels the calibration gas along an outline face, which extends into a guide face within the feed through opening.

8. The calibration device according to claim 7, wherein the calibration segments are formed such, that the calibration gas, expelled from the at least one blowing nozzle, follows the contour of the outline face.

9. The calibration device according to claim 7, wherein the outline face is an outer face of the respective calibration segment.

10. The calibration device according to claim 7, wherein the outline face is at least partially curved to divert the flow of the calibration gas.

11. The calibration device according to claim 10, wherein the curved part of the outline face has a radius of at least 4 mm.

12. The calibration device according to claim 7, wherein the at least one blowing nozzle expels the calibration gas transversally to the longitudinal axis.

13. The calibration device according to claim 1, wherein the at least one blowing nozzle is connected at least to one pressure source, wherein the pressure source provides the calibration gas with a pressure of less than 0.5 bar.

14. The calibration device according to claim 1, wherein the calibration segments are formed arcuate around the longitudinal axis.

15. The calibration device according to claim 1, wherein an adjuster is provided to separately control, for each calibration segment, at least one of the volume flows and the temperature of the calibration gas, exiting from the calibration segments.

16. The calibration device according to claim 1, wherein several calibration segments are arranged above one another and that the calibration segments, which are arranged above each other, are adjustable to different diameters of the feed through opening.

17. The calibration device according to claim 4, wherein the gap width of the blowing gap is less than 0.5 mm.

18. The calibration device according to claim 12, wherein the at least one blowing nozzle expels the calibration gas at a right angle to the longitudinal axis.

19. The calibration device according to claim 1 further comprising:
    a carrier frame; and
    a plurality of arms, each of the plurality of arms having a proximate end and a distal end, the proximate end being pivotally connected to the carrier frame about a pivot axis and the distal end being connected to a respective one of the plurality of calibration segments.

20. The calibration device according to claim 19, wherein the pivot axis extends parallel with the longitudinal axis.

* * * * *